US011798545B2

(12) United States Patent
Gao et al.

(10) Patent No.: US 11,798,545 B2
(45) Date of Patent: Oct. 24, 2023

(54) SPEECH INTERACTION METHOD AND APPARATUS, DEVICE AND STORAGE MEDIUM

(71) Applicant: Beijing Xiaomi Pinecone Electronics Co., Ltd., Beijing (CN)

(72) Inventors: Luyu Gao, Beijing (CN); Tianwei Sun, Beijing (CN); Baiming Ma, Beijing (CN)

(73) Assignee: Beijing Xiaomi Pinecone Electronics Co., Ltd., Beijing (CN)

( * ) Notice: Subject to any disclaimer, the term of this patent is extended or adjusted under 35 U.S.C. 154(b) by 482 days.

(21) Appl. No.: 16/932,148

(22) Filed: Jul. 17, 2020

(65) Prior Publication Data

US 2021/0210088 A1 Jul. 8, 2021

(30) Foreign Application Priority Data

Jan. 8, 2020 (CN) .......................... 202010017436.7

(51) Int. Cl.
*G10L 15/22* (2006.01)
*G06F 16/2452* (2019.01)

(52) U.S. Cl.
CPC ........ *G10L 15/22* (2013.01); *G06F 16/24522* (2019.01)

(58) Field of Classification Search
CPC ... G10L 15/22; G10L 15/26; G06F 16/24522; G06F 9/4887; G06F 9/453; G06F 3/167
USPC ....................................................... 704/270
See application file for complete search history.

(56) References Cited

U.S. PATENT DOCUMENTS

| | | | | |
|---|---|---|---|---|
| 9,792,336 B1* | 10/2017 | Burns | .................... | G06F 16/252 |
| 10,521,189 B1* | 12/2019 | Ryabov | .................. | G06F 40/117 |
| 11,138,894 B1* | 10/2021 | Bosman | .................. | G09B 5/12 |
| 11,699,442 B2* | 7/2023 | Scanlon | .................. | G10L 15/22 |
| | | | | 704/270.1 |
| 2004/0054998 A1 | 3/2004 | Hayashi | | |
| 2004/0073538 A1* | 4/2004 | Leishman | ........... | G06F 16/9537 |
| 2011/0004881 A1 | 1/2011 | Terechko et al. | | |

(Continued)

FOREIGN PATENT DOCUMENTS

| | | |
|---|---|---|
| CN | 101656800 A | 2/2010 |
| CN | 110209791 A | 9/2019 |

(Continued)

OTHER PUBLICATIONS

First Office Action of Chinese Application No. 202010017436.7, dated Jun. 14, 2022.

(Continued)

*Primary Examiner* — Thuykhanh Le
(74) *Attorney, Agent, or Firm* — Finnegan, Henderson, Farabow, Garrett & Dunner, L.L.P.

(57) ABSTRACT

A speech interaction method includes: acquiring speech information of a user; determining a task list corresponding to the speech information, the task list comprising at least two ordered tasks; and for each task in the at least two ordered tasks, responsive to that a next task of a present task is a question-answer task, querying and sending response information of the next task to a user terminal before execution time of the next task arrives, such that the user terminal outputs the response information when the execution time of the next task arrives.

14 Claims, 8 Drawing Sheets

(56) References Cited

U.S. PATENT DOCUMENTS

| | | | |
|---|---|---|---|
| 2014/0172953 A1* | 6/2014 | Blanksteen | H04L 67/535 |
| | | | 709/203 |
| 2016/0042735 A1 | 2/2016 | Vibbert et al. | |
| 2016/0308811 A1* | 10/2016 | Cinar | G06Q 50/01 |
| 2018/0062691 A1* | 3/2018 | Barnett, Jr. | G06F 3/167 |
| 2018/0182392 A1* | 6/2018 | Li | H04R 1/406 |
| 2018/0232203 A1* | 8/2018 | Gelfenbeyn | G10L 15/22 |
| 2018/0314552 A1* | 11/2018 | Kim | G06F 9/485 |
| 2018/0374482 A1* | 12/2018 | Woo | G10L 15/22 |
| 2019/0066677 A1 | 2/2019 | Jaygarl et al. | |
| 2019/0272590 A1* | 9/2019 | Marusic | G06Q 40/00 |
| 2019/0279620 A1* | 9/2019 | Talwar | G10L 15/22 |
| 2019/0294630 A1* | 9/2019 | Alakoye | G10L 15/26 |
| 2019/0295552 A1* | 9/2019 | Pasko | G10L 15/30 |
| 2019/0325084 A1* | 10/2019 | Peng | G06F 16/90335 |
| 2019/0334764 A1* | 10/2019 | Chor | H04L 41/0686 |
| 2019/0370413 A1* | 12/2019 | Sehgal | G06N 5/022 |
| 2019/0384855 A1* | 12/2019 | Bhattacharya | G06N 5/02 |
| 2020/0019419 A1* | 1/2020 | Yada | G06V 10/776 |
| 2020/0053157 A1* | 2/2020 | Smith | H04L 63/083 |
| 2020/0097472 A1* | 3/2020 | Vertsel | G06F 16/248 |
| 2020/0111487 A1* | 4/2020 | Sanganabhatla | G06F 3/167 |
| 2020/0160852 A1* | 5/2020 | Markley | G10L 13/02 |
| 2020/0160856 A1* | 5/2020 | Kline | G06F 3/167 |
| 2020/0168211 A1* | 5/2020 | Feng | G06F 1/163 |
| 2020/0175019 A1* | 6/2020 | Pichaimurthy | G06F 16/7837 |
| 2020/0184977 A1* | 6/2020 | Song | G10L 15/28 |
| 2020/0211546 A1* | 7/2020 | Schairer | G16Y 40/10 |
| 2020/0219493 A1* | 7/2020 | Li | H04R 3/005 |
| 2020/0242184 A1* | 7/2020 | Chengalvala | G06F 16/90332 |
| 2020/0275250 A1* | 8/2020 | Choi | H04W 12/0431 |
| 2020/0286484 A1* | 9/2020 | Scanlon | G06F 3/012 |
| 2020/0302122 A1* | 9/2020 | Lai | G06F 16/288 |
| 2020/0302923 A1* | 9/2020 | Ni | G06F 3/165 |
| 2020/0312324 A1* | 10/2020 | Tang | G06N 3/08 |
| 2020/0327893 A1* | 10/2020 | Taki | G10L 15/22 |
| 2020/0342223 A1* | 10/2020 | Mixter | G06F 3/167 |
| 2020/0372910 A1* | 11/2020 | Okuda | G06Q 10/10 |
| 2020/0379727 A1* | 12/2020 | Blatz | G06F 3/04842 |
| 2020/0401555 A1* | 12/2020 | Magazine | G10L 15/26 |
| 2020/0404219 A1* | 12/2020 | Yerli | G06T 19/006 |
| 2020/0411004 A1* | 12/2020 | Luo | G06F 40/30 |
| 2021/0006862 A1* | 1/2021 | Tsuru | H04N 21/44218 |
| 2021/0020174 A1* | 1/2021 | Liu | G10L 15/08 |
| 2021/0035561 A1* | 2/2021 | D'Amato | G06F 3/167 |
| 2021/0035572 A1* | 2/2021 | D'Amato | G06F 3/167 |
| 2021/0043200 A1* | 2/2021 | Goncalves Jordao | |
| | | | G10L 15/187 |
| 2021/0048930 A1* | 2/2021 | Chow | H04M 1/72436 |
| 2021/0082420 A1* | 3/2021 | Kraljic | H04L 51/02 |
| 2021/0118435 A1* | 4/2021 | Stahl | G10L 15/19 |
| 2021/0124736 A1* | 4/2021 | Rumiantsau | G06F 40/205 |
| 2021/0126985 A1* | 4/2021 | Brush | H04L 67/60 |
| 2021/0136224 A1* | 5/2021 | Curtin | H04M 3/5175 |
| 2021/0150772 A1* | 5/2021 | Yasui | G06T 11/00 |
| 2021/0174791 A1* | 6/2021 | Shen | G06N 3/04 |
| 2021/0174809 A1* | 6/2021 | Yamada | G10L 15/1815 |
| 2021/0200597 A1* | 7/2021 | Mochizuki | G10L 15/22 |
| 2021/0210100 A1* | 7/2021 | Wang | G10L 17/24 |
| 2021/0272563 A1* | 9/2021 | Iwase | G10L 15/32 |
| 2021/0272585 A1* | 9/2021 | Han | G16H 50/70 |
| 2023/0169956 A1* | 6/2023 | D'Amato | A61M 25/0136 |
| | | | 704/275 |

FOREIGN PATENT DOCUMENTS

| | | |
|---|---|---|
| CN | 111903138 A | 11/2020 |
| JP | 2002315069 A | 10/2002 |
| JP | 2020530580 A | 10/2020 |
| KR | 20110023570 A | 3/2011 |
| KR | 20190021143 A | 3/2019 |
| KR | 20200136382 A | 12/2020 |
| WO | WO 2019/177377 A1 | 9/2019 |
| WO | WO 2019188393 A1 | 10/2019 |
| WO | WO 2020175293 A1 | 9/2020 |

OTHER PUBLICATIONS

Examination Report of Indian Application No. 202044030604, dated Aug. 27, 2021.
Notice of Reasons for Refusal of Japanese Application No. 2020-125373, dated Sep. 7, 2021.
Notification of Reason for Refusal of Korean Application No. 10-2020-0090663, dated Aug. 31, 2021.
Hao Yang, Microsoft Yiwen Voice Assistant Design, A thesis submitted in partial satisfaction of the Requirements for the degree of Master of Arts in Design in the Graduate School of Hunan University, dated Apr. 6, 2016, 66 pages.
Supplementary European Search Report in European Application No. 201835030, dated Dec. 11, 2020.

* cited by examiner

SPEECH INTERACTION METHOD AND APPARATUS, DEVICE AND STORAGE MEDIUM

CROSS-REFERENCE TO RELATED APPLICATIONS

This application is based upon and claims priority to Chinese Patent Application No. 202010017436.7, filed on Jan. 8, 2020, the entire content of which is incorporated herein by reference.

TECHNICAL FIELD

The present application generally relates to the technical field of speech interaction (voice interaction), and more particularly, to a speech interaction method and apparatus, a device and a storage medium.

BACKGROUND

With the continuous improvement of artificial intelligence technologies, man-machine speech interaction has also been developed, and various speech assistants (voice assistants) and man-machine interaction devices have been favored by more and more users. Speech interaction refers to interaction with a machine using a speech as an information carrier. A series of inputs and outputs are generated by interaction, communication and information exchange of a person and a computer to complete a task or achieve a purpose. Compared with a conventional man-machine interaction manner, speech interaction is faster and simpler.

In an existing speech interaction process, after a user inputs a speech into a machine, if the speech corresponds to a question-answer task, the machine may look for a result matching the speech in a corpus and then feeds back the result to the user. If the speech corresponds to a control task, the machine may execute the corresponding control task. Take an intelligent speaker as an example, the intelligent speaker may be connected to a network and, after acquiring an input speech of a user, execute a task corresponding to the input speech.

In related art, speech interaction is usually in a question-answer form. For example, a user asks: Xiaoai (wakeup word), how is the weather today? The intelligent speaker answers: it is clear to cloudy, with north wind of grade 3, the temperature is 19 to 26 degrees centigrade, and the air quality is good. However, in such an interaction manner, a speech assistant may only give a single reply and may not meet a requirement of a complex scenario requiring multiple replies.

SUMMARY

According to a first aspect of embodiments of the present disclosure, a speech interaction method includes: acquiring speech information of a user; determining a task list corresponding to the speech information, the task list including at least two ordered tasks; and for each task in the at least two ordered tasks, responsive to that a next task of a present task is a question-answer task, querying and sending response information of the next task to a user terminal before execution time of the next task arrives, such that the user terminal outputs the response information when the execution time of the next task arrives.

According to a second aspect of embodiments of the present disclosure, a speech interaction method includes: sending acquired speech information to a speech interaction system; and receiving response information of a present task sent by the speech interaction system before execution time of the present task arrives, such that the response information of the present task is output when the execution time of the present task arrives.

According to a third aspect of embodiments of the present disclosure, a speech interaction apparatus includes: a processor; and a memory for storing instructions executable by the processor; wherein the processor is configured to: acquire speech information of a user; determine a task list corresponding to the speech information, the task list including at least two ordered tasks; and for each task in the at least two ordered tasks, responsive to that a next task of a present task is a question-answer task, query and send response information of the next task to a user terminal before execution time of the next task arrives, such that the user terminal outputs the response information when the execution time of the next task arrives.

According to a fourth aspect of embodiments of the present disclosure, there is provided a non-transitory computer-readable storage medium having stored therein instructions that, when executed by a processor of a device, cause the device to perform the speech interaction method in the first or second aspect.

It is to be understood that the above general description and detailed description below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Figure 1:
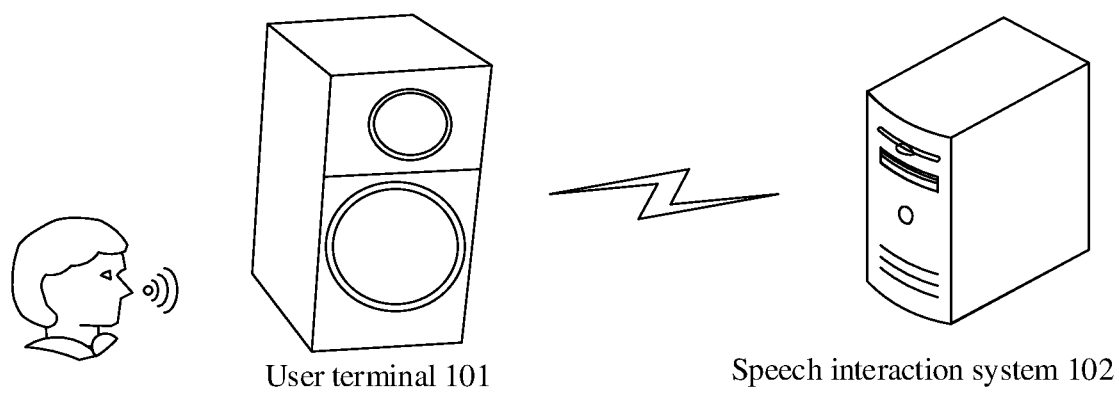
FIG. 1 is an application scenario diagram of a speech interaction method, according to an exemplary embodiment of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The embodiments set forth in the following description of exemplary embodiments do not represent all embodiments consistent with the present disclosure. Instead, they are merely examples of apparatuses and methods consistent with aspects related to the present disclosure as recited in the appended claims.

Terms used in the present disclosure are only adopted for the purpose of describing exemplary embodiments and not intended to limit the present disclosure. For example, the term "if" used here may be explained as "while" or "when" or "responsive to determining," which depends on the context.

With the arrival of the artificial intelligent age, intelligent speech assistants have been applied to daily life extensively, and involved in a broad scope of applications, from smart phones and intelligent home appliances to vehicle scenarios and smart home care. According to different application scenarios and various complex requirements, interaction manners for users and speech assistants are also enriched. A series of inputs and outputs are generated by interaction, communication and information exchange of a person and a computer to complete a task or achieve a purpose. Speech interaction refers to interaction with a machine using a speech as an information carrier. Compared with a conventional man-machine interaction manner, speech interaction is faster and simpler. For example, when a song is played, a few minutes may be needed to input, query and play for a conventional graphic user interface (GUI), while a shorter time is needed for speech interaction. The user's hands are freed, complex operations over an application (APP) are avoided, and a speech task may be assigned to a terminal at the same time of driving. The speech task may be a question-answer task, namely a user asks and the terminal answers. The speech task may also be a control task, namely the user controls another device, particularly a smart home device and the like, through a speech.

A multi-round dialog manner has emerged for meeting increasingly complex requirements of a user on an intelligent speech assistant. For example, the multi-round dialog may be:

user: Xiaoai, set the alarm clock.
Xiaoai: what time do you want to set the alarm clock at?
user: set the alarm clock at 7 a.m.
Xiaoai: OK, the alarm clock has been set for you at 7 a.m.

The multi-round dialog manner is an interaction manner provided for the condition that an intention of the user is ambiguous due to loose questioning. The intelligent speech assistant is required to actively continue the dialog to further acquire a complete requirement of the user and then give a single reply to this requirement. Each round of the dialog is also in a question-answer form.

For the question-answer manner or the multi-round dialog manner, the speech assistant may only give a single reply every time and may not meet a requirement of a complex scenario requiring multiple replies.

In view of this, embodiments of the present disclosure provide speech interaction solutions. A mapping relationship between speech information and a task list may be pre-configured, and the task list may include multiple tasks. After speech information of a user is obtained, a task list corresponding to the speech information may be determined, so that one speech may correspond to multiple tasks, the user is not required to input multiple speeches, speech interaction responses are enriched, man-machine interaction efficiency is improved, and the problem of speech recognition reduction caused by multiple speech interactions is solved. Moreover, for each task in at least two ordered tasks, responsive to that a next task of a present task is a question-answer task, response information of the next task is queried and sent to a user terminal before execution time of the next task arrives, such that the user terminal outputs the response information when the execution time of the next task arrives, to ensure high timeliness and accuracy of the response information of the task.

Embodiments of the present disclosure may be applied to an application scenario including a user terminal and a speech interaction system. The user terminal and a server of the speech interaction system may be configured in the same electronic device and may also be configured in different electronic devices. When the user terminal and the server are configured in the same electronic device, audio input, audio processing, task execution and the like may be completed by the same device. When the user terminal and the server are configured in different electronic devices, processing pressure of the user terminal may be alleviated. The user terminal may be a terminal with a speech acquisition function and, for example, may be a smart phone, a tablet computer, a personal digital assistant (PDA), a wearable device, an intelligent speaker, and the like. The speech interaction system may be a server with a speech processing capability. In an embodiment, the user terminal may be an intelligent speaker and the speech interaction system may be the server.

FIG. 1 is an application scenario diagram of a speech interaction method, according to an exemplary embodiment of the present disclosure. In the application scenario, a user may speak to a user terminal 101, the user terminal 101 acquires speech information and sends the acquired speech information to a speech interaction system 102, and the speech interaction system 102 may perform speech processing. In an embodiment, the speech interaction system 102 may include an automatic speech recognition (ASR) module, a natural language processing (NLP) module, a task scheduling module, and a text to speech (TTS) module. The ASR module converts a speech into a text. The NLP module interprets the text and gives a feedback. The task scheduling module performs task scheduling. The TTS module converts output information into a speech. It is to be understood that the speech interaction system 102 may be other architectures in the related art.

Figure 2:
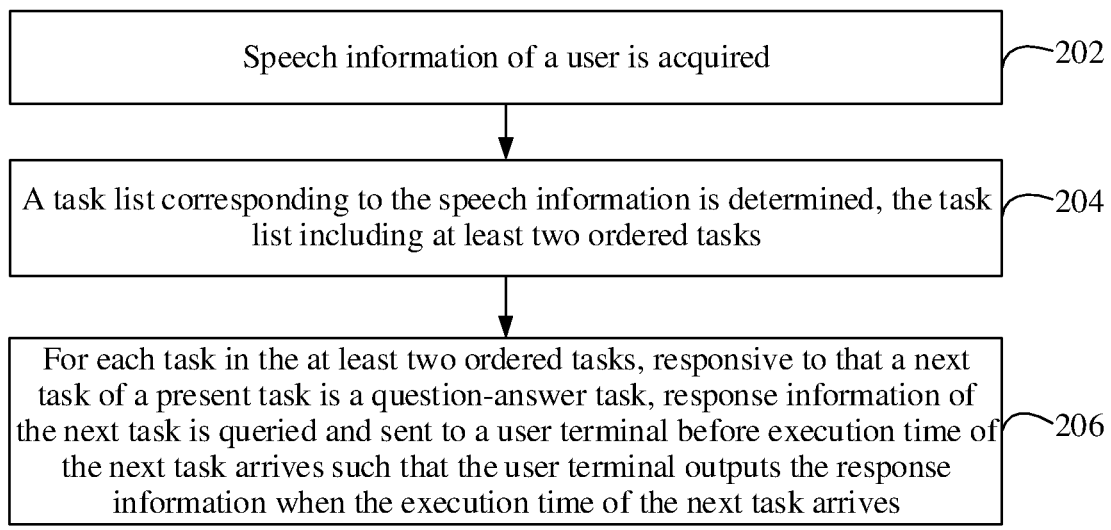
FIG. 2 is a flow chart of a speech interaction method, according to an exemplary embodiment of the present disclosure.

FIG. 2 is a flow chart showing a speech interaction method, according to an exemplary embodiment of the present disclosure. The method may include the following steps.

In step 202, speech information of a user is acquired.

In step 204, a task list corresponding to the speech information is determined, and the task list includes at least two ordered tasks.

In step 206, for each task in the at least two ordered tasks, responsive to that a next task of a present task is a question-answer task, response information of the next task is queried and sent to a user terminal before execution time of the next task arrives, such that the user terminal outputs the response information when the execution time of the next task arrives.

The speech interaction method provided in the embodiment may be implemented by software, or hardware, or a combination of software and hardware, and the involved hardware may be formed by two or more physical entities and may also be formed by one physical entity. For example, the method in the embodiment may be applied to a speech interaction system, and the speech interaction system may be configured in an electronic device with a speech processing capability or formed by an electronic device with the speech processing capability. The electronic device may be a terminal device, may also be a server device and may be configured as required. For illustrative purposes, it is assumed that the speech interaction system executes the speech interaction method in the embodiments below.

The speech information of the user may be speech information acquired by the user terminal, and is sent to the speech interaction system by the user terminal. In the speech interaction system, a mapping relationship between speech information and a task list may be pre-configured. The task list corresponding to the speech information may be configured by the user. For example, a configuration interface is provided, and a response is made to a configuration instruction input by the user to obtain the task list corresponding to the speech information. The task list corresponding to the speech information may also be recommended by the system and may be configured as required.

In the embodiment, the task list corresponding to the speech information is configured to achieve correspondence of one speech and multiple tasks. The task list includes the at least two ordered tasks. For example, the task list may include various types of tasks, and there may be an execution sequence requirement for each task. For example, the tasks in the task list include, but not limited to, a question-answer task, a control task, and the like. The question-answer task may be a task that requires query and response of the speech interaction system. The control task may be a task that requires the speech interaction system to control a device, for example, controlling a smart home device, such as controlling a smart lamp to be turned on/off and controlling a smart rice cooker to be turned on/off, etc. Recognition and semantic comprehension of an input speech may be considered as recognition of a scenario. For example, if the speech information is "good morning," it may be considered as a getting-up scenario, and the tasks in the corresponding task list may include: play soothing music (for 20 minutes) and simultaneously open a bedroom curtain; then play morning news (for 20 minutes); next play the weather forecast; and finally play a traffic condition of a road to work.

In some embodiments, a task in the task list may have a real-time result query requirement, for example, a traffic condition of the road to work. If the speech "good morning" is received, response information of each question-answer task is immediately queried, for example, the traffic condition of the road to work is queried, and is collectively transmitted to the user terminal for caching. When it is time to play traffic condition information, the cached traffic condition may be a traffic condition at least 40 minutes ago, making the traffic condition inaccurate.

Therefore, in some embodiments, the user terminal is enabled to make various complex replies and simultaneously ensure high timeliness and accuracy of contents of the replies. In an embodiment, for each task in the at least two ordered tasks, responsive to that the next task of the present task is a question-answer task, the response information of the next task is queried and sent to the user terminal before the execution time of the next task arrives, such that the user terminal outputs the response information when the execution time of the next task arrives.

In the embodiment, the response information of the next task may be queried when the next task is about to be executed, so that timeliness and accuracy of the response information obtained by the user terminal are ensured.

In an embodiment, execution time of each task is marked in the task list, and in such case, the present time state may be determined to be before the execution time of the next task arrives, for example, query is performed at a preset time before the execution time arrives. In another embodiment, when a task request of executing the next task is received from the user terminal, it is determined that the present time state is before the execution time of the next task arrives. For example, before the operation that the response information of the next task is queried and sent to the user terminal, the method further includes that: a task request containing task information of the next task sent by the user terminal is received. A time when the user terminal sends the task request may be before the execution time of the next task arrives. For example, the user terminal may determine completion time of the present task, so that, if the next task is executed immediately after the present task, the user terminal may send the task request of the next task to the speech interaction system when the present task is completed or at a preset time before completion, to enable the speech interaction system to, when receiving the task request, judge that the present time state is before the execution time of the next task arrives and further start querying the response information corresponding to the next task. For another example, if the user terminal knows the execution time of the next task, the user terminal may send the task request, etc. to the speech interaction system at a preset time before the execution time of the next task arrives. The execution time of the next task may be determined by the task list transmitted by the speech interaction system, the task list recording execution time of the tasks; and it may also be determined by the task information, transmitted by the speech interaction system, of the next task, the task information including the execution time of the next task.

In an embodiment, the user terminal may store the task list to determine the next task. The task list may be historically stored, and may also be fed back by the speech interaction system after the speech information is sent to the speech interaction system. In another embodiment, the speech interaction system, when sending the present task to the user terminal, may also send the task information of the next task. The user terminal determines the next task according to a task identifier in the task information. In an embodiment, the task request may further contain the task information of the next task. The task information may at least be configured to uniquely identify the next task. For example, the task information of the next task at least includes identification information of the next task, so that the next task may be determined by the task information. The task information in the task request may be determined by the user terminal according to the task list, and may also be the task information, contained when the speech interaction system sends response information of the present task, of the next task.

In some scenarios, increase of requests may increase a request processing burden of the speech interaction system and test performance (for example, high concurrency, running time complexity, and the like) of the speech interaction system. On one hand, the performance of the speech interaction system may be improved to solve the problem. On the other hand, query time may be reduced due to the provided task information. For example, besides the identification information capable of uniquely identifying the next task, the task information of the next task may further include, but not limited to, one or more of index information of a question in the next task, a type of the question in the next task and the execution time of the next task. The index information is information configured to index an answer to the question in the next task. The answer corresponding to the question in the next task may be rapidly queried through the index information, so that the query time is reduced.

Different questions are classified, and answers corresponding to different types of questions are stored in different databases, so that, according to the type of a question, data query may be directly performed in the database corresponding to this type, and query efficiency may further be improved.

It is to be understood that the task information may further include another field capable of improving the query efficiency. In addition, the present time state may also be determined in other means. The preset time may be preconfigured time with less influence on accuracy of the response information, and from the preset time to the execution time of the next task, query, feedback and the like of the response information may be completed. Even in some scenarios, because of a relatively high query speed, the preset time may be 0, namely the response information of the next task is queried and sent to the user terminal when the execution time of the next task arrives.

In an embodiment, for a next task that requires execution of a real-time query operation, regardless of a type of the next task, the user terminal may send the task request containing the task information of the next task to the speech interaction system. The next task includes any task in a question-answer task with a real-time performance requirement or a question-answer task without the real-time performance requirement. In other words, for the question-answer task with the real-time performance requirement or the question-answer task without the real-time performance requirement, query is performed before the execution time of the task arrives, and the response information is fed back to the user terminal.

Furthermore, the task information of the next task may also be sent to the user terminal when the response information of the present task is sent to the user terminal, and correspondingly, when the response information of the next task is sent to the user terminal, task information of an unprocessed task (a third-round task) adjacent to the next task is sent to the user terminal, to implement simultaneous transmission of task information of an adjacent task every time when response information of a task is transmitted. Therefore, the user terminal, when the response information of the next task is completely executed, may know the task required to be executed next and, even before execution time of the unprocessed task adjacent to the next task arrives, send a task request containing the task information to the speech interaction system to request for execution of the third-round task.

In the embodiment, the response information of the present task and the task information of the next task are transmitted every time, the response information of the present task is played, and before the execution time of the next task arrives, a request for the response information of the next task may be made by using the task information, so that the timeliness of the response information may be ensured.

In some scenarios, real-time query may bring relatively high processing pressure to the speech interaction system, so that the number of query times of the speech interaction system may be reduced in a manner of reducing the number of task requests. For example, question-answer tasks are divided into question-answer tasks with the real-time performance requirement and question-answer tasks without the real-time performance requirement. The question-answer task with the real-time performance requirement refers to a question-answer task with a requirement on the timeliness of response information, for example, a task of playing a real-time traffic condition, and the like. The question-answer task without the real-time performance requirement may be a question-answer task with no or low requirement on the timeliness of response information, for example, a task of playing soothing music for 20 minutes, and the like. A type of the question-answer task may be configured by the user, and may also be obtained by big data analysis of the system.

In another embodiment, the next task is a question-answer task with the real-time performance requirement. In other words, under the condition that the next task is a question-answer task with the real-time performance requirement, the response information of the next task may be queried and sent to the user terminal before the execution time of the next task arrives, so that the processing pressure of the speech interaction system is reduced. For the condition that the task information is required to be sent, in an embodiment, when the response information of the next task is sent to the user terminal, the following operation is further included: the task information of the unprocessed task adjacent to the next task is sent to the user terminal. The user terminal may judge whether the next task is a question-answer task with the real-time performance requirement or a question-answer task without the real-time performance requirement according to the task information and, when determining according to the task information that the next task is a question-answer task with the real-time performance requirement, may send the task request containing the task information to the speech interaction system before the execution time of the next task arrives.

According to the embodiment, no matter whether the task has the real-time performance requirement, the task information is transmitted, and then the user terminal may judge whether to send the task request.

In another embodiment, when the response information of the next task is sent to the user terminal, the following operation is further included: responsive to that the unprocessed task adjacent to the next task is a question-answer task with the real-time performance requirement, the task information of the unprocessed task adjacent to the next task is sent to the user terminal, and the user terminal stores the task list.

In the embodiment, only task information of a task with the real-time performance requirement is sent, so that resource waste caused by information transmission when task information of a task without the real-time performance requirement is also sent is avoided, and judgment processes of the user terminal are reduced. The user terminal, under the condition that the task information of the unprocessed task adjacent to the next task is not received, may directly determine the next task according to the task list and locally acquire and output the response information of the unprocessed task adjacent to the next task.

For the question-answer task without the real-time performance requirement, the response information of such a question-answer task may be fed back to the user terminal at a specified time. For example, in a process of executing a first task in the task list, one or more question-answer tasks without the real-time performance requirement in the task list may be determined, and response information of all of the one or more question-answer tasks without the real-time performance requirement is transmitted to the user terminal, such that the user terminal locally acquires and outputs the response information according to a sequence of the one or more question-answer tasks in the task list.

In the embodiment, the response information of the question-answer task without the real-time performance requirement may be collectively transmitted at one time, so that the number of the task requests may be reduced, and pressure of a server may be alleviated.

With respect to the operation that the response information of the next task is queried and sent to the user terminal, the response information corresponding to the next task may be queried, and the obtained response information is sent to the user terminal. The response information may be audio information, text information, picture information, and the like. Correspondingly, outputting the response information may be playing the audio information and displaying the text information and the picture information, etc. Exemplarily, interaction is usually performed through an audio in the speech interaction process, so that the response information may be the audio information, and outputting the response information may be playing the audio information.

Besides question-answer tasks, the tasks in the task list may also be control tasks configured to control devices. In an embodiment, the method further includes that: if the next task is a control task of controlling a smart home device, a control instruction corresponding to the control task is sent to an Internet of things system to enable the Internet of things system to control the corresponding smart home device.

In the embodiment, not only may question-answer be implemented, but also the smart home device may be controlled, so that application scenarios of speech interaction are extended.

In some scenarios, a new user speech may be received when a task in the task list is not completely executed. In an embodiment, execution of the task that is not completely executed in the task list may be delayed; and in another embodiment, the user terminal may directly be stopped from executing the task that is not completed in the task list, and the task that is not completely executed is cleared. For example, when a task in the task list is not completely executed, if a new user speech is received, execution of the task that is not completed by the user terminal in the task list is interrupted. In addition, prompting information may also be output, and whether to continue executing the task that is not completely executed in the task list is determined according to a user instruction, so task controllability is achieved.

Figure 3:
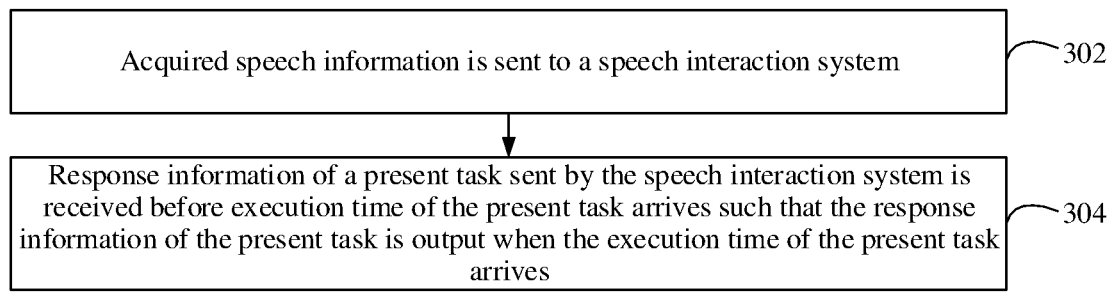
FIG. 3 is a flow chart of a speech interaction method, according to an exemplary embodiment of the present disclosure.

FIG. 3 is a flow chart showing another speech interaction method, according to an exemplary embodiment of the present disclosure. The method may include the following steps.

In step 302, acquired speech information is sent to a speech interaction system.

In step 304, response information of a present task sent by the speech interaction system is received before execution time of the present task arrives, such that the response information of the present task is output when the execution time of the present task arrives.

The method in the embodiment may be applied to a user terminal. For example, the user terminal may be a device with a speech acquisition function such as a smart phone, a tablet computer, a PDA, a wearable device, an intelligent speaker, and the like.

The response information of the present task sent by the speech interaction system may be received before the execution time of the present task arrives, such that the response information of the present task is output when the execution time of the present task arrives. The present task may be a question-answer task with a real-time performance requirement, may also be a question-answer task without the real-time performance requirement and may also be a control task, etc. In an embodiment, when the present task is a question-answer task, such as a question-answer task with the real-time performance requirement, the response information of the present task may be queried and obtained by the speech interaction system at a short time before the execution time of the present task arrives (for example, a preset time before the execution time of the present task arrives), so that high timeliness and accuracy of the response task of the task are ensured. The preset time may be a relatively short time configured as required.

In an embodiment, there is no pre-stored task list corresponding to the speech information, and the user terminal determines a task through task information sent by the speech interaction system. In an embodiment, there is pre-stored the task list corresponding to the speech information, and the user terminal may determine the task in the task list. In an embodiment, regardless of a type of a next task, a task request containing task information of the next task is sent to implement timely query for any type of question-answer task. In an embodiment, a task request is sent only for a question-answer task with the real-time performance requirement or a control task (in some examples, the task request is also not required to be sent even for the control task). The user terminal may pre-store response information of question-answer tasks without the real-time performance requirement to determine that the next task is a question-answer task without the real-time performance requirement and, when execution time of the next task arrives, locally acquire and output the response information of the next task. In the speech interaction system, when the response information of the present task is sent, regardless of the type of the next task, task information of the next task is transmitted such that task information of each task, except for a first task, in the task list is sent; or, when the response information of the present task is sent, if the next task is a question-answer task with the real-time performance requirement or a control task, the task information of the next task is transmitted. Whether to send the response information of the present task may be determined by, for example, whether a task request is received.

In an embodiment, the speech interaction system may send the task information of each task, except for the first task, in the task list. In the user terminal, the response information of the present task further contains task information of a next task, and the method further includes that: a task request containing the task information of the next task is sent to the speech interaction system before execution time of the next task arrives, such that the speech interaction system feeds back corresponding response information before the execution time of the next task arrives. Therefore, response information of each question-answer task may be queried and obtained in real time.

In another embodiment, response information of all question-answer tasks without the real-time performance requirement is obtained in advance. In the user terminal, the method further includes that: when the present task is the first task in the task list corresponding to the speech information, the response information of all of the question-answer tasks without the real-time performance requirement in the task list is further received from the speech interaction system. In such case, whether the next task is a question-answer task with the real-time performance requirement or a control task may be determined according to the task information, transmitted by the speech interaction system, of the next task; if it is determined according to the task information that the next task is a question-answer task with the real-time performance requirement or a control task of controlling a smart home device, the task request containing the task information is sent to the speech interaction system before the execution time of the next task arrives; and if it is determined according to the task information that the next task is a question-answer task without the real-time performance requirement, the response information of the next task is locally acquired and output when the execution time of the next task arrives.

According to the embodiment, the user terminal judges the type of the next task according to the task information to further determine whether to send the task request, so that the number of times for sending task requests may be reduced, and furthermore, processing pressure of the speech interaction system is alleviated.

In an embodiment, the speech interaction system may send task information of a task with the real-time performance requirement or task information of a control task in the task list. If the user terminal receives the task information of the next task, it is indicated that the next task is a question-answer task with the real-time performance requirement or a control task, and the task request containing the task information is sent to the speech interaction system at the preset time before the execution time of the next task arrives. For example, the user terminal pre-stores the task list corresponding to the speech information, and the method further includes that: the task information of the next task in the task list is determined; and the task request containing the task information of the next task is sent to the speech interaction system before the execution time of the next task arrives such that the speech interaction system feeds back the corresponding response information before the execution time of the next task arrives.

Furthermore, if only the response information of the present task sent by the speech interaction system is received, it is indicated that the next task is a task of which the response information has been stored. Therefore, if only the response information of the present task sent by the speech interaction system is received, the response information is output, the next task is determined according to the task list, and the response information of the next task is locally acquired and output when the execution time of the next task arrives.

In the embodiment, a request is sent to the speech interaction system only when a task is a question-answer task with the real-time performance requirement or a control task, so that the number of sending times is reduced.

In an embodiment, the user terminal may store the task list and may also not store the task list. For example, if the speech interaction system transmits task information of each task, the user terminal is not required to store the task list. The speech interaction system may perform query for each task, and may also query and send the response information of the next task to the user terminal for a task with the real-time performance requirement before the execution time of the task arrives. Whether the task is a question-answer task with the real-time performance requirement may be judged by the user terminal and may also be judged by the speech interaction system.

Figure 4:
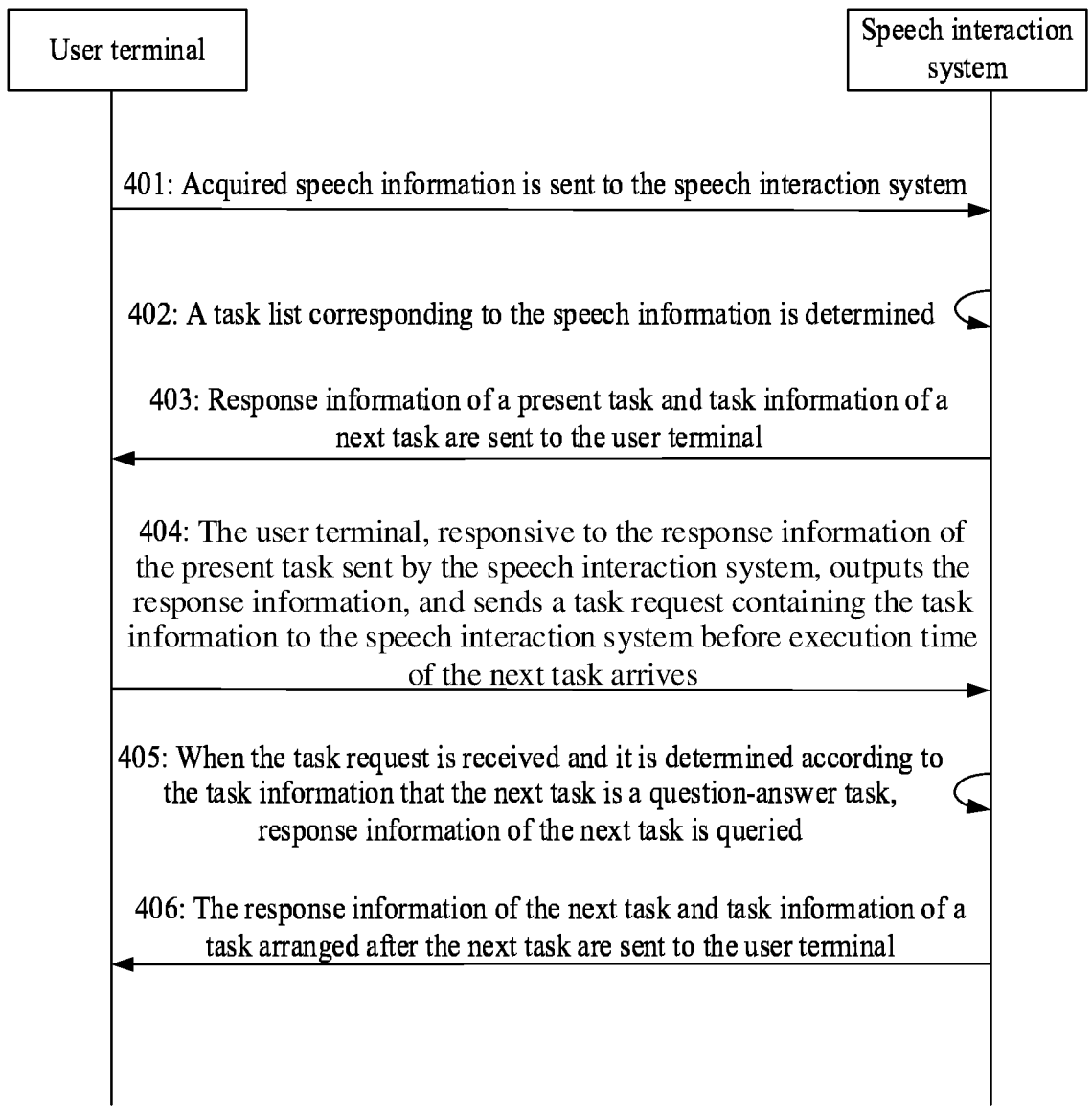
FIG. 4 is a flow diagram of a speech interaction method, according to an exemplary embodiment of the present disclosure.

FIG. 4 is a flow diagram of a speech interaction method, according to an exemplary embodiment of the present disclosure. In the embodiment, a task request is sent for each task except for a first task and a user terminal is not required to store a task list. The method includes the following steps.

In step 401, acquired speech information is sent by a user terminal to a speech interaction system.

In step 402, a task list corresponding to the speech information is determined by the speech interaction system, and the task list includes at least two ordered tasks.

In step 403, response information of a present task and task information of a next task are sent by the speech interaction system.

In step 404, responsive to the response information of the present task sent by the speech interaction system, the response information is output by the user terminal, and a task request containing the task information is sent to the speech interaction system before execution time of the next task arrives.

In step 405, when receiving the task request and determining according to the task information that the next task is a question-answer task, response information of the next task is queried by the speech interaction system.

In step 406, the response information of the next task and task information of a task arranged after the next task are sent by the speech interaction system to the user terminal.

The process may be repeated until all the tasks in the task list are completely executed.

Furthermore, the speech interaction system, when receiving the task request and determining according to the task information that the next task is a control task, may send a control instruction corresponding to the control task to an Internet of things system to enable the Internet of things system to control a corresponding smart home device.

In the embodiment, the response information of the present task and the task information of the next task are transmitted every time, and after the response information of the present task is completely played, a request for the response information of the next task may be made by using the task information, so that timeliness of the response information may be ensured.

Figure 5:
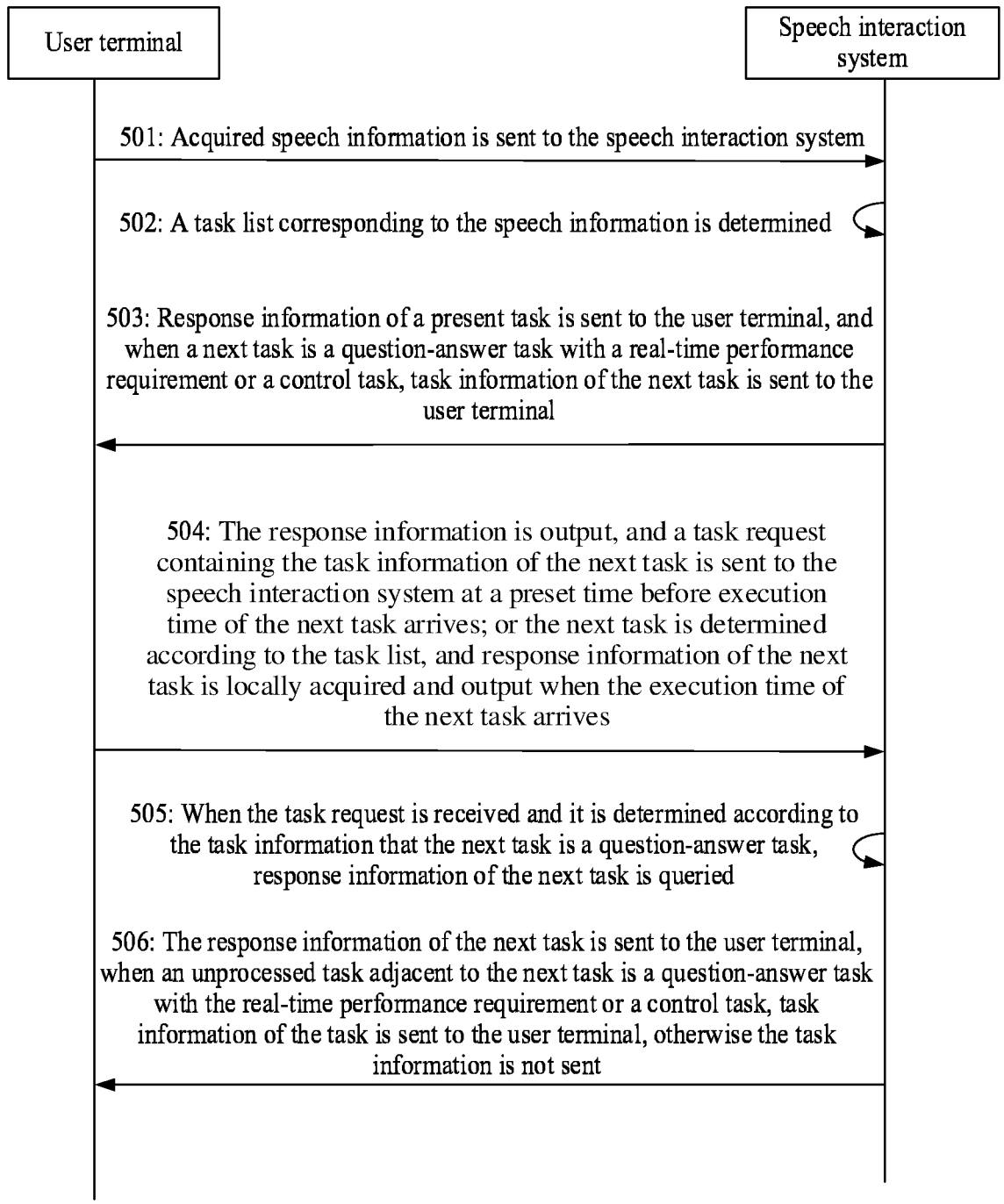
FIG. 5 is a flow diagram of a speech interaction method, according to an exemplary embodiment of the present disclosure.

FIG. 5 is a flow diagram of a speech interaction method, according to an exemplary embodiment of the present disclosure. In the embodiment, task requests are sent only for a control task and a question-answer task with a real-time performance requirement and a user terminal stores a task list. The method includes the following steps.

In step 501, a user terminal sends acquired speech information to a speech interaction system.

In step 502, the speech interaction system determines a task list corresponding to the speech information, and the task list includes at least two ordered tasks.

In step 503, the speech interaction system sends response information of a present task to the user terminal, and when a next task is a question-answer task with a real-time performance requirement or a control task, sends task information of the next task to the user terminal, otherwise does not send the task information.

In step 504, the user terminal, responsive to the response information of the present task and the task information of the next task sent by the speech interaction system, outputs the response information, and sends a task request containing the task information of the next task to the speech interaction system at a preset time before execution time of the next task arrives; and responsive to the received response information of the present task sent by the speech interaction system (the task information of the next task is not received, which indicates that the next task is not a question-answer task with the real-time performance requirement or a control task), outputs the response information, determines the next task according to the task list and locally acquires and outputs response information of the next task when the execution time of the next task arrives.

In step 505, the speech interaction system, when receiving the task request and determining according to the task information that the next task is a question-answer task, queries response information of the next task.

In step 506, the response information of the next task is sent to the user terminal, when an unprocessed task adjacent to the next task is a question-answer task with the real-time performance requirement or a control task, task information of the task is sent to the user terminal, otherwise the task information is not sent.

The process may be repeated until the tasks in the task list are completely executed.

Furthermore, the speech interaction system, in a process of executing a first task in the task list, determines one or more question-answer tasks without the real-time performance requirement in the task list and transmits response information of all of the one or more question-answer tasks without the real-time performance requirement to the user terminal.

In the embodiment, task information of a control task or a task with the real-time performance requirement is sent only, and task information of a task without the real-time performance requirement is not sent, so that the number of requests may be reduced, and processing pressure of the speech interaction system is further alleviated.

Figure 6:
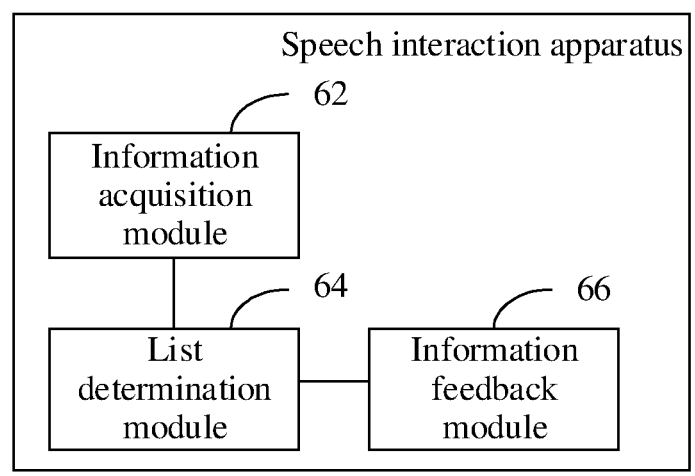
FIG. 6 is a block diagram of a speech interaction apparatus, according to an exemplary embodiment of the present disclosure.

FIG. 6 is a block diagram of a speech interaction apparatus, according to an exemplary embodiment of the present disclosure. The apparatus includes: an information acquisition module 62 configured to acquire speech information of a user; a list determination module 64 configured to determine a task list corresponding to the speech information, the task list including at least two ordered tasks; and an information feedback module 66 configured to, for each task in the at least two ordered tasks, responsive to that a next task of a present task is a question-answer task, query and send response information of the next task to a user terminal before execution time of the next task arrives, such that the user terminal outputs the response information when the execution time of the next task arrives.

In an embodiment, the next task is a question-answer task with a real-time performance requirement.

In an embodiment, the information feedback module 66 is configured to, before the response information of the next task is queried and sent to the user terminal, receive a task request containing task information of the next task sent by the user terminal.

In an embodiment, the information feedback module 66 is configured to, when the response information of the next task is sent to the user terminal, send task information of an unprocessed task adjacent to the next task to the user terminal; or, responsive to that the unprocessed task adjacent to the next task is a question-answer task with the real-time performance requirement, send the task information of the unprocessed task adjacent to the next task to the user terminal, the user terminal storing the task list.

In an embodiment, the task information of the next task at least includes identification information of the next task, and the task information of the next task further includes at least one of index information of a question in the next task, a type of the question in the next task or the execution time of the next task.

In an embodiment, the information feedback module 66 is further configured to, before the response information of the next task is queried and sent to the user terminal, in a process of executing a first task in the task list, determine one or more question-answer tasks without the real-time performance requirement in the task list and transmit response information of all of the one or more question-answer tasks without the real-time performance requirement to the user terminal, such that the user terminal locally acquires and outputs the response information according to a sequence of the one or more question-answer tasks in the task list.

In an embodiment, the apparatus further includes a task interruption module (not shown in FIG. 6), configured to: when a task in the task list is not completely executed, if a new user speech is received, interrupt execution of the task that is not completed by the user terminal in the task list.

Figure 7:
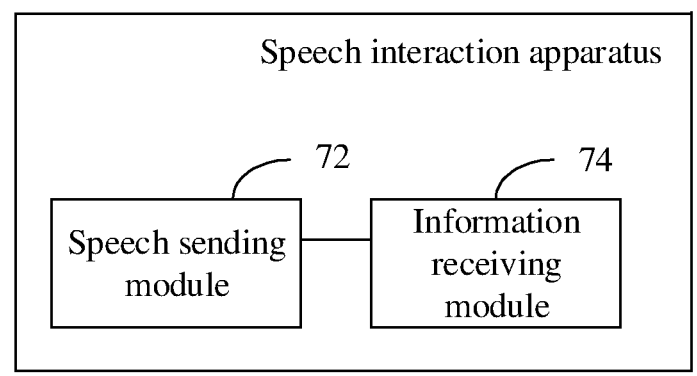
FIG. 7 is a block diagram of a speech interaction apparatus, according to an exemplary embodiment of the present disclosure.

FIG. 7 is a block diagram of a speech interaction apparatus, according to an exemplary embodiment of the present disclosure. The apparatus includes: a speech sending module 72 configured to send acquired speech information to a speech interaction system; and an information receiving module 74 configured to receive response information of a present task sent by the speech interaction system before execution time of the present task arrives, such that the response information of the present task is output when the execution time of the present task arrives.

In an embodiment, the response information of the present task further contains task information of a next task, and the apparatus further includes a first request sending module (not illustrated in FIG. 7), configured to: send a task request containing the task information of the next task to the speech interaction system before execution time of the next task arrives, such that the speech interaction system feeds back corresponding response information before the execution time of the next task arrives.

In an embodiment, a task list corresponding to the speech information is pre-stored, and the apparatus further includes: a task information determination module (not shown in FIG. 7) configured to determine task information of a next task in the task list; and a second request sending module (not shown in FIG. 7) configured to send a task request containing the task information of the next task to the speech interaction system before execution time of the next task arrives, such that the speech interaction system feeds back corresponding response information before the execution time of the next task arrives.

In an embodiment, the next task is a question-answer task with a real-time performance requirement.

In an embodiment, the apparatus further includes a task execution module (not shown in FIG. 7), configured to: determine according to the task information that the next task is a question-answer task without the real-time performance requirement and locally acquire and output response information of the next task when the execution time of the next task arrives.

The apparatus embodiments substantially correspond to the method embodiments. For detailed operations of each module in the apparatus, reference may be made to the above description of the method embodiments. The apparatus embodiments described above are only exemplary, modules described as separate parts therein may or may not be physically separated, and parts displayed as modules may be located in the same place or may also be distributed to multiple networks. Part or all of the modules therein may be selected according to a practical requirement.

An embodiment of the present disclosure also provides a computer-readable storage medium, in which a computer program is stored, the program being executed by a processor to implement the steps of any one of the above described methods.

The storage medium includes, but is not limited to, a disk memory, a compact disc read-only memory (CD-ROM), an optical memory, and the like. The computer-readable storage medium includes nonvolatile, volatile, removable and unremovable media and may store information by any method or technology. The information may be a computer-readable instruction, a data structure, a program module or other data. Examples of the computer storage medium include, but not limited to, a Phase change random access memory (PRAM), a static random access memory (SRAM), a dynamic random access memory (DRAM), a random access memory (RAM) of another type, a read-only memory (ROM), an electrically erasable programmable Rom (EEPROM), a flash memory or another memory technology, a CD-ROM, a digital video disk (DVD) or another optical memory, a cassette memory, a magnetic tape, a disk memory or another magnetic storage device or any other non-transmission medium, and may be configured to store information accessible for a computer device.

An embodiment of the present disclosure provides an electronic device, which includes: a processor; and a memory configured to store instructions executable by the processor; wherein the processor is configured to execute the instructions to implement any one of the above speech interaction methods.

Figure 8:
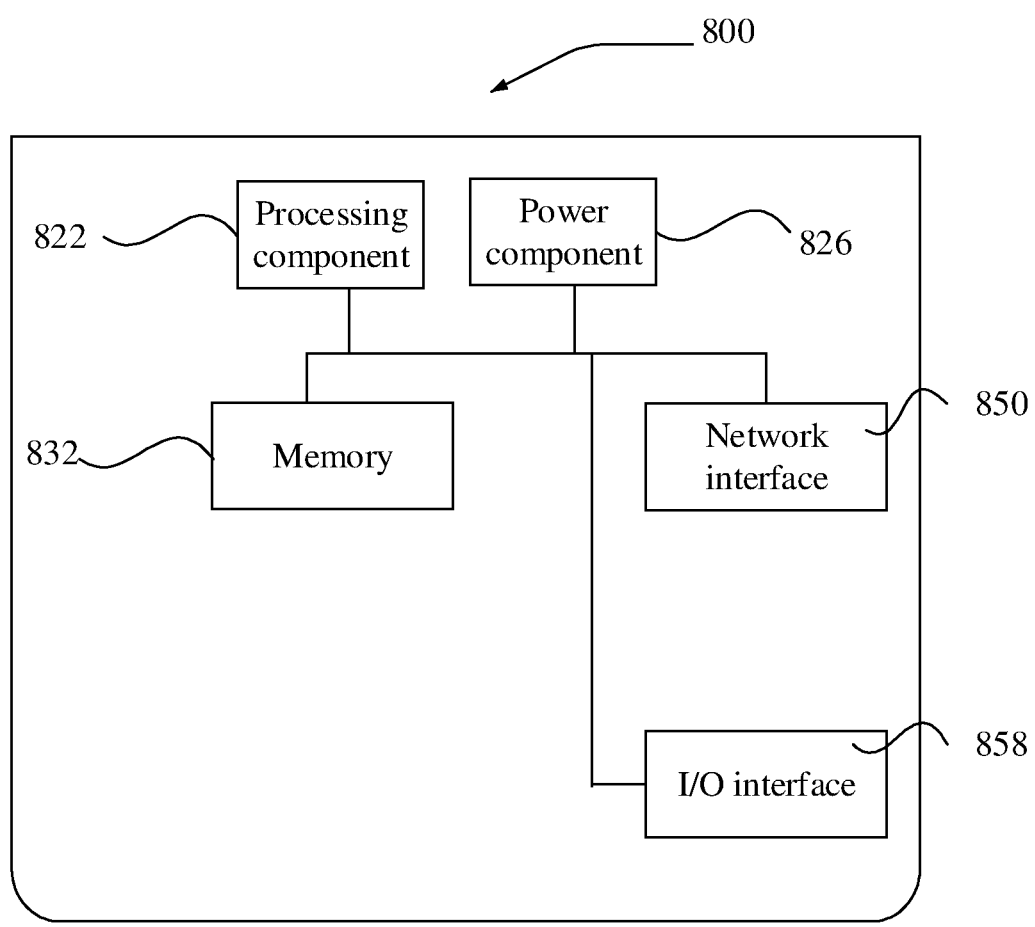
FIG. 8 is a schematic diagram of a speech interaction apparatus, according to an exemplary embodiment of the present disclosure.

FIG. 8 is a schematic diagram of a speech interaction apparatus 800, according to an exemplary embodiment. For example, the apparatus 800 may be provided as a user terminal or a speech interaction system. Referring to FIG. 8, the apparatus 800 includes a processing component 822, which may further include one or more processors, and a memory resource represented by a memory 832, configured to store instructions executable by the processing component 822, for example, an application (APP). The APP stored in the memory 832 may include one or more modules, each of which corresponds to a set of instructions. In addition, the processing component 822 is configured to execute the instructions to execute the above speech interaction methods.

The apparatus 800 may further include a power component 826 configured to execute power management of the apparatus 800, a wired or wireless network interface 850 configured to connect the apparatus 800 to a network and an input/output (I/O) interface 858. The apparatus 800 may be operated based on an operating system stored in the memory 832, for example, Android, iOS, Windows Server™, Mac OS X™, Unix™, Linux™, FreeBSD™ or the like.

In an exemplary embodiment, there is also provided a non-transitory computer-readable storage medium including instructions such as the memory 832 including instructions, and the instructions may be executed by the processing component 822 of the apparatus 800 to implement the above described methods. For example, the non-transitory computer-readable storage medium may be a ROM, a RAM, a CD-ROM, a magnetic tape, a floppy disc, an optical data storage device, and the like.

Other implementations of the present disclosure will be apparent to those skilled in the art from consideration of the specification and practice of the present disclosure. The present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A speech interaction method, comprising:
  acquiring, by a speech interaction system from a user terminal, speech information of a user;
  determining, by the speech interaction system, a task list corresponding to the speech information, the task list comprising at least two ordered tasks;
  sending, by the speech interaction system, response information of a present task and task information of a next task to the user terminal; and
  for each task in the at least two ordered tasks, responsive to that the next task of the present task is a question-answer task with a real-time performance requirement,
    outputting, by the user terminal, the response information of the present task to the user;
    sending, by the user terminal, a task request containing the task information of the next task to the speech interaction system;
    judging, by the speech interaction system, that a present time state is before execution time of the next task arrives;
    querying and sending, by the speech interaction system, response information of the next task to the user terminal before the execution time of the next task arrives, and
    outputting, by the user terminal, the response information of the next task when the execution time of the next task arrives,
  wherein before querying and sending the response information of the next task to the user terminal, the method further comprises:
    in a process of executing a first task in the task list, determining, by the speech interaction system, one or more question-answer tasks without a real-time performance requirement in the task list;
    transmitting, by the speech interaction system, response information of all of the one or more question-answer tasks without the real-time performance requirement to the user terminal; and
    locally acquiring and outputting, by the user terminal, the response information of all of the one or more question-answer tasks without the real-time performance requirement according to a sequence of the one or more question-answer tasks in the task list.

2. The method of claim 1, when sending the response information of the next task to the user terminal, further comprising:
  sending, by the speech interaction system, task information of an unprocessed task adjacent to the next task to the user terminal; or
  responsive to that the unprocessed task adjacent to the next task is a question-answer task with a real-time performance requirement, sending, by the speech interaction system, the task information of the unprocessed task adjacent to the next task to the user terminal, the user terminal storing the task list.

3. The method of claim 1, wherein the task information of the next task comprises identification information of the next task; and the task information of the next task further comprises at least one of index information of a question in the next task, a type of the question in the next task, or the execution time of the next task.

4. The method of claim 1, further comprising:
when a task in the task list is not completely executed, responsive to that a new user speech is received, interrupting execution of the task that is not completed by the user terminal in the task list.

5. The method of claim 1, further comprising: if the next task is a control task of controlling a smart home device, a control instruction corresponding to the control task is sent to an Internet of things system to enable the Internet of things system to control the smart home device.

6. A speech interaction method, comprising:
sending, by a user terminal, acquired speech information to a speech interaction system;
receiving, by the user terminal, response information of a present task sent by the speech interaction system before execution time of the present task arrives, and
outputting the response information of the present task, by the user terminal, when the execution time of the present task arrives,
wherein the response information of the present task further contains task information of a next task, the method further comprising:
responsive to that the next task is a question-answer task with a real-time performance requirement,
sending, by the user terminal, a task request containing the task information of the next task to the speech interaction system before execution time of the next task arrives,
judging, by the speech interaction system, that a present time state is before the execution time of the next task arrives, and
feeding back, by the speech interaction system, corresponding response information of the next task before the execution time of the next task arrives,
wherein a task list corresponding to the speech information is pre-stored, the method further comprising:
responsive to that the next task is a question-answer task with a real-time performance requirement,
determining, by the user terminal, task information of a next task in the task list;
sending, by the user terminal, a task request containing the task information of the next task to the speech interaction system before the execution time of the next task arrives,
judging, by the speech interaction system, that a present time state is before the execution time of the next task arrives, and
feeding back, by the speech interaction system, corresponding response information of the next task before the execution time of the next task arrives,
wherein the method further comprises:
when the present task is a first task in the task list, receiving, by the user terminal, response information of all question-answer tasks without a real-time performance requirement in the task list from the speech interaction system;
determining, by the user terminal, according to the task information that the next task is a question-answer task without a real-time performance requirement, and
locally acquiring and outputting, by the user terminal, response information of the next task when the execution time of the next task arrives.

7. The method of claim 6, further comprising: if the next task is a control task of controlling a smart home device, a control instruction corresponding to the control task is sent to an Internet of things system to enable the Internet of things system to control the smart home device.

8. A speech interaction apparatus, comprising:
a processor; and
a memory for storing instructions executable by the processor;
wherein the processor is configured to:
acquire, by a speech interaction system from a user terminal, speech information of a user;
determine, by the speech interaction system, a task list corresponding to the speech information, the task list comprising at least two ordered tasks; and
send, by the speech interaction system, response information of a present task and task information of a next task to the user terminal;
for each task in the at least two ordered tasks, responsive to that a next task of a present task is a question-answer task with a real-time performance requirement,
output, by the user terminal, the response information of the present task to the user,
send, by the user terminal, a task request containing the task information of the next task to the speech interaction system,
judge, by the speech interaction system, that a present time state is before execution time of the next task arrives,
query and send, by the speech interaction system, response information of the next task to the user terminal before the execution time of the next task arrives, and
output, by the user terminal, the response information of the next task when the execution time of the next task arrives,
wherein the processor is further configured to, before querying and sending the response information of the next task to the user terminal,
in a process of executing a first task in the task list, determine, by the speech interaction system, one or more question-answer tasks without a real-time performance requirement in the task list,
transmit, by the speech interaction system, response information of all of the one or more question-answer tasks without the real-time performance requirement to the user terminal, and
locally acquire and output, by the user terminal, the response information of all of the one or more question-answer tasks without the real-time performance requirement according to a sequence of the one or more question-answer tasks in the task list.

9. The apparatus of claim 8, wherein when sending the response information of the next task to the user terminal, the processor is further configured to perform one of:
sending task information of an unprocessed task adjacent to the next task to the user terminal; or
responsive to that the unprocessed task adjacent to the next task is a question-answer task with a real-time performance requirement, sending the task information of the unprocessed task adjacent to the next task to the user terminal, the user terminal storing the task list.

10. The apparatus of claim 8, wherein the task information of the next task comprises identification information of the next task; and the task information of the next task further comprises at least one of index information of a question in the next task, a type of the question in the next task, or the execution time of the next task.

11. The apparatus of claim 8, wherein the processor is further configured to:
   when a task in the task list is not completely executed, responsive to that a new user speech is received, interrupt execution of the task that is not completed by the user terminal in the task list.

12. The apparatus of claim 8, wherein the processor is further configured to, if the next task is a control task of controlling a smart home device, send a control instruction corresponding to the control task to an Internet of things system to enable the Internet of things system to control the smart home device.

13. A non-transitory computer-readable storage medium having stored therein instructions that, when executed by a processor of a device, cause the device to perform the speech interaction method of claim 1.

14. A non-transitory computer-readable storage medium having stored therein instructions that, when executed by a processor of a device, cause the device to perform the speech interaction method of claim 6.

* * * * *